Dec. 4, 1928.

F. L. PURDY

FRAME FOR BUILDINGS

Re. 17,154

Original Filed June 8, 1926

2 Sheets-Sheet 1

Inventor

FREDERICK L. PURDY by Finnegan & Finnegan his Attorneys

Dec. 4, 1928. F. L. PURDY Re. 17,154
FRAME FOR BUILDINGS
Original Filed June 8, 1926 2 Sheets-Sheet 2
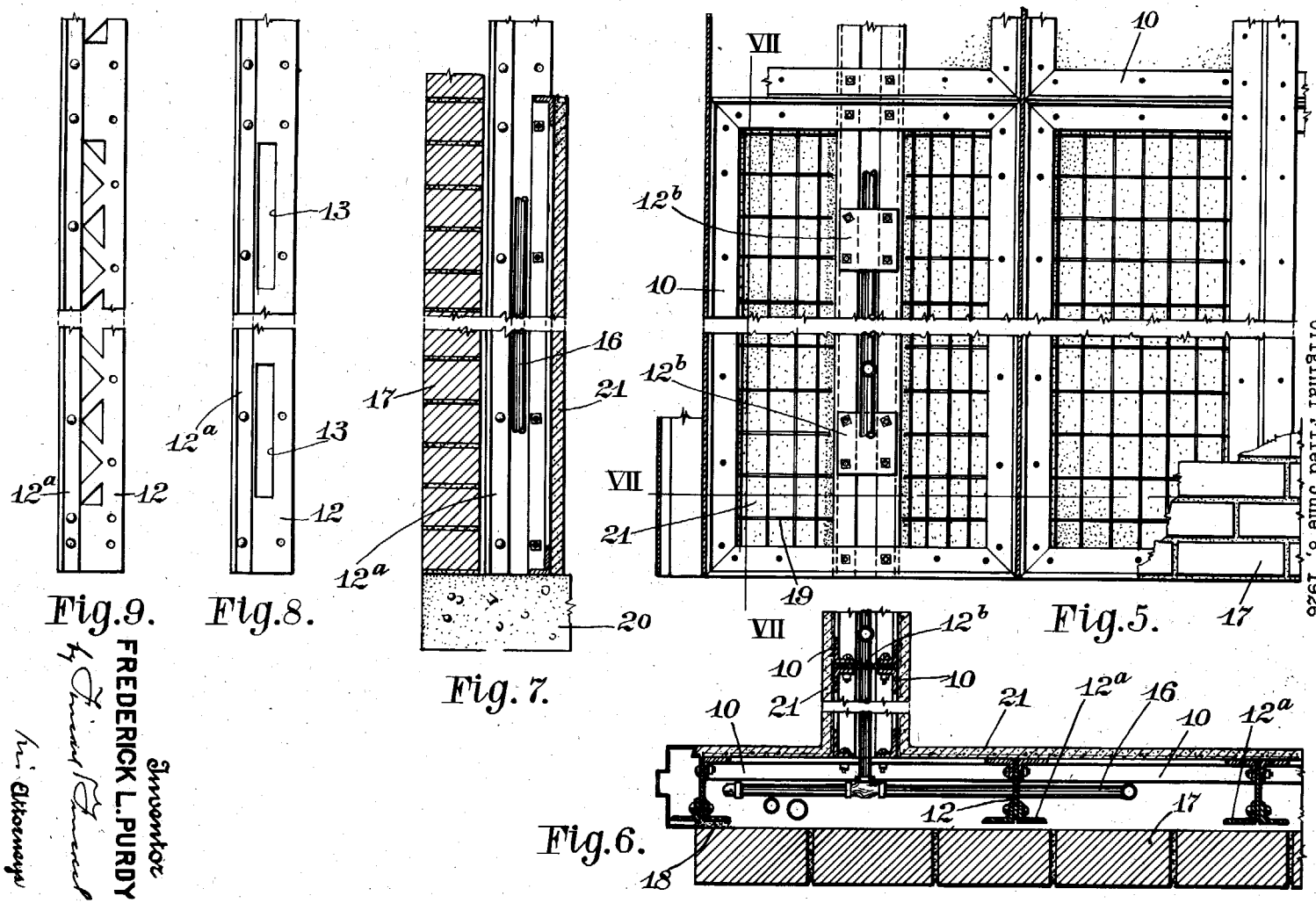
Inventor
FREDERICK L. PURDY
by Fineral & Fineral
his Attorneys Reissued Dec. 4, 1928. Re. 17,154

UNITED STATES PATENT OFFICE.

FREDERICK L. PURDY, OF COLUMBUS, OHIO.

FRAME FOR BUILDINGS.

Original No. 1,604,605, dated October 26, 1926, Serial No. 114,472, filed June 8, 1926. Application for reissue filed October 19, 1928. Serial No. 313,599.

This invention relates to the construction of buildings and particularly to dwellings and such as are designed to have their frames or skeletons of steel or iron and the invention has for its object more especially to provide improvements in details whereby the skeleton is made stronger and provision made for concealing the pipes or conductors for water, gas, electricity or other commodities or services.

Owing to the high cost of lumber and skilled labor it has been proposed to effect economies by erecting a skeleton for a dwelling made up of small metallic members or frames of standard and varied dimensions that can be united by bolts or other simple fastenings not requiring skilled labor and upon this skeleton to apply the weather-excluding and other covering materials. However, as far as I am aware such proposals did not include any or adequate provision for concealing the conductors of domestic commodities aforesaid; nor does it appear that such a structure was as strongly braced in its walls as desirable. My improvement, therefore, is designed to remedy these defects and is particularly beneficial in the construction of such skeleton because the unit frames can be made of lighted weight they being firmly supported and at the same time providing suitable space for the installation and concealing of the conductors aforesaid.

The invention is embodied in the example herein shown and described, the features of novelty being finally claimed.

In the accompanying drawings—

Fig. 5 is a view in elevation on a larger scale than appears in Fig. 1 broken out at points and looking from the exterior of the dwelling to show in greater detail the features of the construction.

Fig. 6 is a horizontal section on the line VI—VI Fig. 5 showing in addition thereto a portion of a partition connected therewith.

Fig. 7 is a vertical section on the line VII—VII Fig. 5 with brick veneer added.

Fig. 8 is a side elevation of a column member broken out according to my invention.

Fig. 9 is a modified form of column member.

Figure 4:
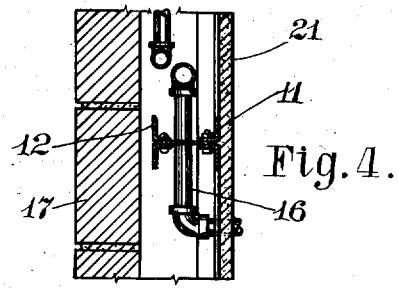
Fig. 4 is a horizontal section of a wall on, say the line IV—IV Fig. 3.
Figure 2:
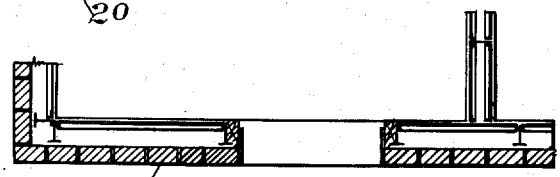
Fig. 2 is a diagrammatic projection in horizontal section from Fig. 1.

The small component or unit frames of the dwelling will be made of various sizes such as indicated at 10, $10^a$ and $10^b$ some of which as at $10^c$ and $10^d$ located at points requiring extra strength have diagonal or cross braces or both. The rims of these frames are constructed of metallic angle bars having their backs outward so that the frames can be united by bolts and nuts as seen at 11 in Fig. 4.

Figure 3:
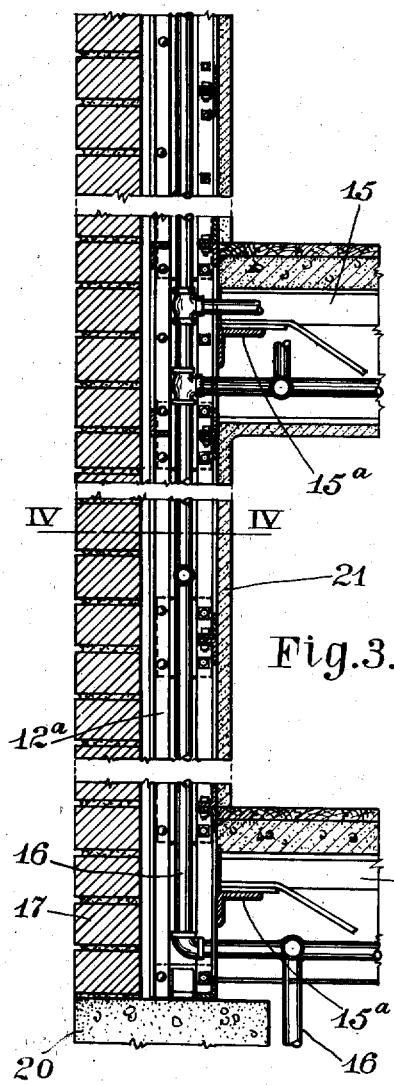
Fig. 3 is a vertical section on a larger scale broken out at points to illustrate possible arrangements of pipes therein.

To give thickness and strength to the wall and provide space for the installation of conductors as heretofore stated I provide vertically extending column members consisting of stout strips 12 of a width proportioned to the desired thickness of wall and of metal having openings or slots 13 thereon. These column strips are provided with one or two reinforcing angle irons $12^a$ along one longitudinal margin riveted or bolted thereto. The column members are bolted at suitable intervals between adjacent frames 10, $10^a$ and so forth, and the lower ends of said column members with the frames footed in the foundation wall 20 as shown in Figs. 3 and 7.

In Fig. 9 the column is shown to have a lattice form, the openings of which should be of sufficient dimension, number and location to permit the passage of the conductors referred to.

As shown in the drawings the columns when installed project toward the exterior of the building, their outer reinforced margins being outermost and affording surfaces to which the veneer can be bonded.

Partitions, as shown in Figs. 5 and 6 can be constructed of the unit frames, such as 10, with short batten plates $12^b$ instead of full length column strips such as shown in Figs. 8 and 9 with the reinforcing angle bars $12^a$ shown in those views omitted. The batten plates in such a partition can be bolted or otherwise suitably secured to or between the flanges of the frames as illustrated in Fig. 5 and the upper portion of Fig. 6.

The floor beams 15 in such structures can be of the type known as bar joists, the ends of which are shown as supported on suitable heavy shelf angles 15[a]. A consideration of Figs. 3 and 6 will indicate how water and gas pipes 16 can be run from the cellar into and upward and horizontally or laterally therefrom in the spacing afforded by the provision of the column, it being noted that pipes or other conductors can be extended through the slots 13 or other openings in the column strips or webs.

Figure 1:
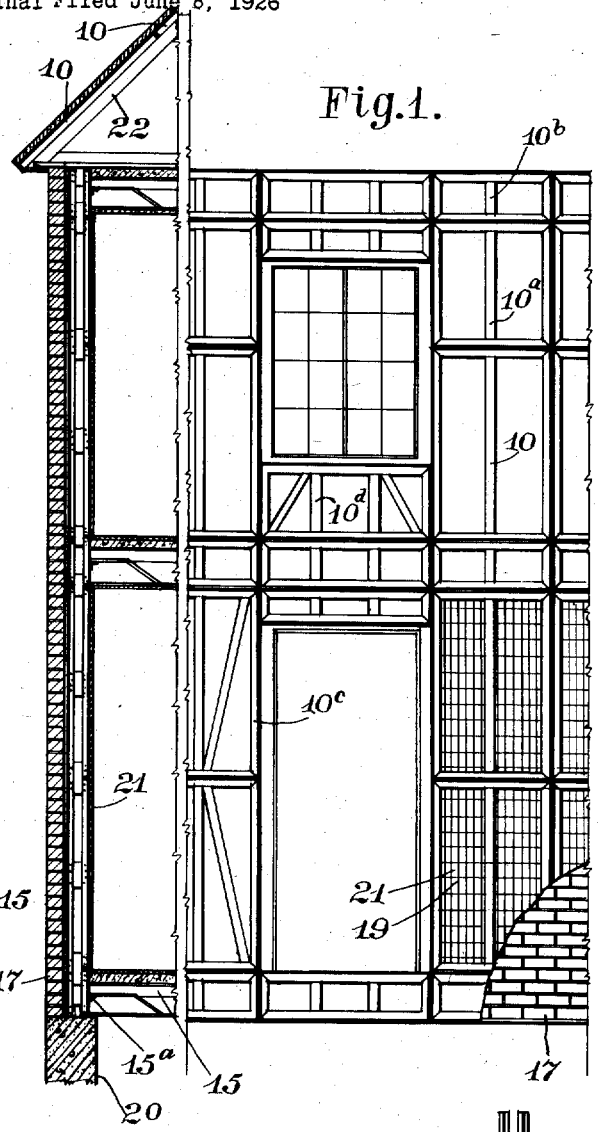
Figure 1 is a view in combined elevation and vertical section showing a portion of a frame and wall of a typical dwelling with my invention embodied therein.

The column members can be used as rafters in the roof as suggested in Fig. 1 where 10 is the frame and 22 the web of the column acting as a rafter.

The exterior of the wall skeleton herein described can be provided with an exterior veneer 17 of brick, stone or other material.

If the building is to be stuccoed on the exterior and plastered in the interior the double frame type of construction such as shown for the partition in Figs. 5 and 6 can be used for the outer walls and any type of plaster or stocco bond applied thereto.

At the interior of the skeleton any suitable form of metallic plaster lath 19 is secured to the flange of the frames and the plaster 21 applied thereto. Before applying the veneer and plaster the conductors referred to should all be put in place and tested, it being observed that after those coverings are applied such conductors become concealed.

All the parts of the frame can be manufactured and some of them put together in the shop and the parts can, if desired, be suitably painted or measures taken to render them rust proof before or after erection.

Because the wall is provided with the column members described the unit frames 10, 10[a] and so forth, can be of single angle bar form and of lighter weight than if such frames alone were employed to constitute the skeleton of the wall. The invention is well adapted in dwelling construction in that it allows for application of screens at the window and door openings because of thickness of wall provided.

Unless otherwise limited the term "wall" as used in the claims is intended to include a floor or roof structure as well as a side wall or partition.

The forms of the parts can be changed without departing from the gist of the invention as claimed.

What I claim is:

1. A skeleton frame for a wall of a building including metallic open frame units of angle bar, a continuous metallic column member of flat metal interposed at one margin between adjoining bars of said frame units, means penetrating both the column member and said frame bars for securing them together, the other margin of the column member projecting beyond the plane of the frame units.

2. A skeleton frame for a wall of a building including metallic open frame units of angle bar, a continuous metallic column member of flat metal interposed at one margin between adjoining bars of said frame units, means penetrating both the column member and said frame bars for securing them together, the other margin of the column member projecting beyond the plane of the frame units, said column member provided with an opening where it projects beyond the frame units.

3. A skeleton frame for a wall of a building including metallic open frame units of angle bar, a continuous metallic column member of flat metal interposed at one margin between adjoining bars of said frame units, means penetrating both the column member and said frame bars securing them together, the other margin of the column member projecting beyond the plane of the frame units, said column member provided with a reinforcing angle extension along said projecting margin.

4. A skeleton frame for a wall of a building including metallic open frame units of angle bar, a continuous metallic column member of flat metal interposed at one margin between adjoining bars of said frame units, means penetrating both the column member and said frame bars securing them together, the other margin of the column member projecting beyond the plane of the frame, said column member provided with an opening and also with a reinforcing angle extension along said projecting margin.

5. A skeleton frame for a wall of a building including two sets of open frame units of angle bar, said sets spaced from each other in parallel planes, and verticaly arranged means between the bars of said frame units connecting said parallel sets of frames, said connecting means affording openings for the horizontal passage of conductors between the two sets of frame units.

6. A skeleton frame for a wall of a building including open frame units of angle bar, a continuous metallic column strip of flat metal at one margin between the bar of adjoining frame units, means penetrating both the strip and the frame bars securing them together, the other margin of said strip projecting beyond the plane of the frame units and toward exterior side of the building.

7. A skeleton frame for a wall of a building including metallic units formed of single angle bars with their backs outermost, a continuous metallic column strip having a flat margin interposed at said margin between adjoining frame units and means penetrating said margin uniting said strip and units, the other margin of said supporting strip standing beyond the plane of the frame units.

8. A skeleton frame for a wall of a building including two sets of open frame members, said sets spaced from each other in parallel planes, said frame members including connecting means affording openings for the horizontal and vertical passage of conductors between the frame members.

9. A skeleton frame for a wall of a building including two sets of open frame members, said sets spaced from each other in parallel planes, said frame members including connecting means affording openings for the vertical passage of conductors between them from one side of a floor to the other.

FREDERICK L. PURDY.